US007443540B2

(12) United States Patent
Kasai et al.

(10) Patent No.: US 7,443,540 B2
(45) Date of Patent: Oct. 28, 2008

(54) ELECTRO-OPTICAL DEVICE, METHOD OF DRIVING THE SAME, DATA LINE DRIVING CIRCUIT, SIGNAL PROCESSING CIRCUIT, AND ELECTRONIC APPARATUS

(75) Inventors: Toshiyuki Kasai, Okaya (JP); Hiroaki Jo, Suwa (JP); Takeshi Nozawa, Suwa (JP); Hiroshi Horiuchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 653 days.

(21) Appl. No.: 11/179,551

(22) Filed: Jul. 13, 2005

(65) Prior Publication Data

US 2006/0066906 A1 Mar. 30, 2006

(30) Foreign Application Priority Data

Sep. 29, 2004 (JP) ............................ 2004-283631

(51) Int. Cl.
*H04N 1/40* (2006.01)
*H04N 1/46* (2006.01)

(52) U.S. Cl. ..................................... 358/3.01; 358/540

(58) Field of Classification Search ................ 358/3.01, 358/1.9, 2.1, 3.21, 3.22, 3.26, 3.27, 540, 358/534, 536

See application file for complete search history.

(56) References Cited

U.S. PATENT DOCUMENTS 6,989,845 B1 * 1/2006 Okamoto et al. ............ 345/691
7,084,577 B2 8/2006 Maede et al.
7,129,916 B2 10/2006 Maede et al.
7,295,689 B2 * 11/2007 Dixon ........................ 382/128
2003/0016198 A1 1/2003 Nagai et al.
2004/0046720 A1 3/2004 Nagai et al.

FOREIGN PATENT DOCUMENTS

JP 2000-307424 A 11/2000
JP A-2003-99003 4/2003
JP A-2004-151693 5/2004
JP A-2004-151694 5/2004

* cited by examiner

*Primary Examiner*—Douglas Q Tran
(74) *Attorney, Agent, or Firm*—Oliff & Berridge, PLC

(57) ABSTRACT

A signal processing unit that generates data signals for controlling gray-scale levels of electro-optical elements includes a first D/A conversion unit that generates gray-scale signals from gray-scale data for designating the gray-scale levels of the electro-optical elements; a storage unit that stores correction data indicating correction values with respect to the gray-scale signals; a second D/A conversion unit that has resolution different from that of the first D/A conversion unit, and that generates correction signals from the correction data stored in the storage unit; and a synthesizing unit that synthesizes the gray-scale signals generated by the first D/A conversion unit with the correction signals generated by the second D/A conversion unit to generate the data signals.

15 Claims, 12 Drawing Sheets

ELECTRO-OPTICAL DEVICE, METHOD OF DRIVING THE SAME, DATA LINE DRIVING CIRCUIT, SIGNAL PROCESSING CIRCUIT, AND ELECTRONIC APPARATUS

BACKGROUND

The present invention relates to an electro-optical device for correcting gray-scale levels of pixels, to a method of driving the same, to a data line driving circuit, to a signal processing circuit, and to an electronic apparatus.

A technique of correcting gray-scale levels of pixels has been suggested. For example, a technique of adding correction data to gray-scale data designating the gray-scale level of each pixel and of D/A converting the added data to adjust the gray-scale level of each pixel is disclosed in Japanese Unexamined Patent Application Publication No. 2000-307424 (paragraph 0008 and FIG. 1).

However, in the above-mentioned structure, since data signals are generated from the sum of the correction data and the gray-scale data by one D/A converter, the minimum value of the correction amount of the data signal by the correction data is limited to resolution when the gray-scale data is D/A converted (the variation of an analog signal when a least significant bit (LSB) of digital data is varied). That is, since analog data signals are generated from the gray-scale data, it is difficult to correct the data signal by the amount of correction smaller than the resolution set in the D/A converter. Of course, when a D/A converter that is compatible with digital data of a larger number of bits is adopted to improve the resolution, the minimum value of the correction amount is reduced, and thus it is possible to accurately correct the gray-scale level of each pixel. However, in this case, additional problems, such as an increase in the size of the D/A converter and an increase in the manufacturing costs thereof, arise.

SUMMARY

An advantage of the invention is that it provides a technique for accurately correcting gray-scale levels of pixels regardless of the resolution of D/A conversion with respect to gray-scale data.

According to an aspect of the invention, a signal processing circuit that generates data signals for controlling gray-scale levels of electro-optical elements includes a first D/A conversion unit that generates gray-scale signals from gray-scale data for designating the gray-scale levels of the electro-optical elements; a storage unit that stores correction data indicating correction values with respect to the gray-scale signals; a second D/A conversion unit that has resolution different from that of the first D/A conversion unit, and that generates correction signals from the correction data stored in the storage unit; and a synthesizing unit that synthesizes the gray-scale signals generated by the first D/A conversion unit with the correction signals generated by the second D/A conversion unit to generate the data signals.

Here, the 'resolution' of the D/A conversion unit means the variation of an analog signal when the least significant bit of the digital data that is input to the D/A conversion unit, that is, the minimum value of the variation of the analog signal that is output from the D/A conversion unit. The higher the resolution of the D/A conversion unit is, the smaller the minimum value of the variation of the analog signal output from the D/A conversion unit becomes. Further, in the invention, the 'electro-optical element' means an element having a property capable of converting electrical energy into optical energy, or optical energy into electrical energy. For example, an organic electro-luminescent (EL) element or an organic light-emitting diode (OLED) made of, for example, light-emitting polymer, can be used as the electro-optical element, but the invention is not limited thereto.

According to this structure, the gray-scale signals are generated from the gray-scale data by the first D/A conversion unit, and the correction signals are generated from the correction data by the second D/A conversion unit having resolution different from that of the first D/A conversion. Therefore, it is possible to arbitrarily select the resolution when the gray-scale data is D/A converted and the resolution when the correction data is D/A converted. Thus, it is possible to accurately correct the gray-scale level of each electro-optical element, regardless of the resolution of D/A conversion with respect to the gray-scale data.

Further, various memories, such as a ROM (read only memory) and a RAM (random access memory), can be used as the storage unit of the invention. When the ROM is used as a storage unit, for example, the correction data is previously written in the storage unit at the time of the manufacture or shipment of the electro-optical device, and thus it is not necessary to update the contents of the storage unit after manufacture or shipment. On the other hand, in the case in which the ROM is used as a storage unit, for example, even if the characteristics of each element of the electro-optical device (for example, the characteristics of the electro-optical elements and the characteristics of the first and second D/A conversion units) vary with the elapse of time, it is possible to always perform the optimum correction on the gray-scale level of each electro-optical element by updating the correction data in the storage unit, corresponding to the variation in the characteristics of the elements.

Furthermore, it is preferable that the synthesizing unit include an adding unit that adds the gray-scale signals generated by the first D/A conversion unit and the correction signals generated by the second D/A conversion unit (see FIGS. 5, 9, and 13). According to this structure, it is possible to generate data signals with a simple structure. Preferably, the first D/A conversion unit and the second D/A conversion unit both generate current signals or voltage signals. That is, in this structure, the first D/A conversion unit generates the current signals corresponding to the gray-scale data as the gray-scale signals, and the second D/A conversion unit generates the current signals corresponding to the correction data as the correction signals. Alternatively, the first D/A conversion unit generates the voltage signals corresponding to the gray-scale data as the gray-scale signals, and the second D/A conversion unit generates the voltage signals corresponding to the correction data as the correction signals.

Further, preferably, the first D/A conversion unit generates the gray-scale signals having pulse widths corresponding to the gray-scale data, and the second D/A conversion unit generates the correction signals having pulse widths corresponding to the correction data. In addition, preferably, the synthesizing unit outputs the gray-scale signals in a first period (for example, a period T1 in FIG. 14), and outputs the correction signals in a second period (for example, a period T2 in FIG. 14) subsequent to the first period. That is, the synthesizing unit generates the data signals by time-division-multiplexing the gray-scale signals and the correction signals (that is, by coupling the gray-scale signals with the correction signals on the time axis).

Further, it is preferable that the synthesizing unit include a multiplier unit that multiplies the gray-scale signals generated by the first D/A conversion unit by the correction signals generated by the second D/A conversion unit. For example, in a structure in which the first D/A conversion unit generates current signals or voltage signals having the levels corresponding to the gray-scale data as the gray-scale signals and the second D/A conversion unit generates correction signals having pulse widths corresponding to the correction data, the synthesizing unit outputs the gray-scale signals generated by the first D/A conversion unit as data signals in the period corresponding to the pulse widths of the correction signals (see FIG. 17). In addition, a structure to synthesize the gray-scale signal and the correction signal using the synthesizing unit is not limited to the above.

According to another aspect of the invention, signal processing circuits are respectively provided corresponding to data lines, and constitute a data line driving circuit. That is, a data line driving circuit of an electro-optical device in which a plurality of electro-optical elements are respectively provided corresponding to intersections of a plurality of scanning lines and a plurality of data lines includes a plurality of signal processing circuits each of which supplies a data signal to the data line. In addition, each data line driving circuit includes: a first D/A conversion unit that generates gray-scale signals from gray-scale data for designating gray-scale levels of the electro-optical elements; a storage unit that stores correction data indicating correction values with respect to the gray-scale signals; a second D/A conversion unit that has resolution different from that of the first D/A conversion unit, and that generates correction signals from the correction data stored in the storage unit; and a synthesizing unit that synthesizes the gray-scale signals generated by the first D/A conversion unit with the correction signals generated by the second D/A conversion unit to generate data signals. According to the above-mentioned structure, the data line driving circuit makes it possible to accurately correct the gray-scale level of each electro-optical element, regardless of the resolution of D/A conversion with respect to the gray-scale data.

For example, in an electro-optical device in which each electro-optical element emits a light component corresponding to any one of display colors, the characteristics of the electro-optical elements respectively corresponding to the display colors may be different from each other. However, according to the data line driving circuit of the invention, it is possible to correct the difference between the characteristics for each display color and thus to maintain a good white balance. In addition, even if a variation in characteristics occurs in each signal processing circuit of the data line driving circuit, it is possible to correct the variation in characteristics by properly selecting correction data. Further, the characteristics of electro-optical devices of the same type may be different from each other for reasons for a manufacturing process. However, according to the data line driving circuit of the invention, it is possible to compensate for the variation in the characteristic of each electro-optical element and thus to achieve an electro-optical device having high display quality.

Furthermore, it is preferable that the resolution of the second D/A conversion unit of each of the signal processing circuits vary according to resolution adjustment signals to be supplied. According to this structure, the resolution of the second D/A conversion unit is adjusted according to the resolution adjustment signal. Therefore, it is possible to arbitrarily adjust the degree of correction with respect to the gray-scale level of each electro-optical element by properly selecting the resolution adjustment signal. In addition, it is preferable to provide a supply unit for supplying the resolution adjustment signal to the second D/A conversion unit of each signal processing circuit. The supply unit generates the resolution adjustment signals by the operation of a user, and then outputs them to the signal processing circuits, respectively. According to this structure, the user can adjust the gray-scale characteristic while directly confirming images displayed on the electro-optical device.

In particular, a difference in characteristic may occur in electro-optical elements, such as OLED elements, corresponding to each display color. Therefore, it is preferable that the resolution adjustment signals be supplied to the display colors, respectively. That is, in this structure, preferably, the second D/A conversion unit of one of the plurality of signal processing circuits corresponding to one display color has resolution varied according to a first resolution adjustment signal, and the second D/A conversion units of the other signal processing circuits corresponding to the other display colors have resolution varied according to a second resolution adjustment signal different from the first resolution adjustment signal. According to this structure, since the resolution of the second D/A conversion circuits respectively corresponding to the display colors vary according to the respective resolution adjustment signals, it is possible to compensate for a different in characteristics for every display color and thus to achieve high display quality. In addition, the resolution adjustment signals may be respectively supplied to the display colors, or one resolution adjustment signal may be supplied to two or more display colors. For example, in a structure in which each electro-optical element corresponds to any one of red, green, and blue, the resolution of the second D/A conversion units of the signal processing circuits corresponding to two colors may be adjusted by the first resolution adjustment signal, and the resolution of the second D/A conversion unit of the signal processing circuit corresponding to the other color may be adjusted by the second resolution adjustment signal.

Further, the detailed structure of the second D/A conversion unit will be described below, particularly focusing on the relationship with the resolution adjustment signal.

First, according to a first aspect of the second D/A conversion unit, the second D/A conversion unit (which corresponds to the second DAC 32*a* shown in FIG. 4) includes a current source (transistor 41) that generates a plurality of currents weighted with different weight values on the basis of the level of the resolution adjustment signal and a selection circuit (switch 43) that selects one of the plurality of currents according to the correction data, and generates the correction signals based on the current selected by the selection circuit. According to this structure, the plurality of currents generated by the current source is adjusted according to the level of the resolution adjustment signal. Therefore, it is possible to arbitrarily adjust the resolution of the second D/A conversion unit by properly adjusting the level of the resolution adjustment signal.

According to a second aspect of the second D/A conversion unit, the second D/A conversion unit (which corresponds to the second DAC 32*b* shown in FIG. 7) includes a voltage generating circuit that generates a plurality of voltages on the basis of the level of the resolution adjustment signal and a selection circuit (switch 53) that selects one of the plurality of voltages according to the correction data, and generates correction signals based on the voltage selected by the selection circuit. According to this structure, the plurality of voltages generated by the voltage generating circuit is adjusted according to the level of the resolution adjustment signal. Therefore, it is possible to arbitrarily adjust the resolution of the second D/A conversion unit by properly adjusting the level of the resolution adjustment signal.

According to a third aspect of the second D/A conversion unit, the resolution adjustment signal is a clock signal, and the second D/A conversion unit (which corresponds to the second DAC 32*c* shown in FIG. 11) includes a pulse signal generating circuit that generates a plurality of pulse signals respectively having pulse widths which are weighted with different weight values, on the basis of a period of the resolution adjustment signal, and a selection circuit (switch 63) that selects one of the plurality of pulse signals according to the correction data, and generates the correction signals based on the pulse signal selected by the selection circuit. According to this structure, the pulse widths of the plurality of pulse signals generated by the pulse signal generating circuit are adjusted by the period of the resolution adjustment signal. Therefore, it is possible to arbitrarily adjust the resolution of the second D/A conversion unit by properly adjusting the period of the resolution adjustment signal.

According to still another aspect of the invention, a data line driving circuit is used for respectively supplying data signals to data lines of an electro-optical device. The electro-optical device includes a plurality of scanning lines; a plurality of data lines; a plurality of electro-optical elements that are respectively provided corresponding to intersections of the scanning lines and the data lines; a scanning line driving circuit that sequentially selects the plurality of scanning lines; and a data line driving circuit that includes a plurality of signal processing circuits for respectively supplying data signals to the data lines. In the electro-optical device, each of the signal processing circuits includes a first D/A conversion unit that generates gray-scale signals from gray-scale data for designating gray-scale levels of the electro-optical elements; a storage unit that stores correction data indicating correction values with respect to the gray-scale signals; a second D/A conversion unit that has resolution different from that of the first D/A conversion unit, and that generates correction signals from the correction data stored in the storage unit; and a synthesizing unit that synthesizes the gray-scale signals generated by the first D/A conversion unit with the correction signals generated by the second D/A conversion unit to generate the data signals. According to the electro-optical device, as described above, it is possible to accurately correct the gray-scale level of each electro-optical element using the signal processing circuit and the data line driving circuit of the invention, regardless of the resolution of D/A conversion with respect to the gray-scale data, and thus it is possible to maintain high display quality. In addition, the electro-optical device can be used as display devices of various electronic apparatuses.

Furthermore, according to still yet another aspect of the invention, a method of driving an electro-optical device having a plurality of electro-optical elements whose gray-scale levels are varied according to data signals includes the following processes of: generating gray-scale signals from gray-scale data designating the gray-scale levels of the electro-optical elements by first D/A conversion; generating correction signals from correction data stored in a storage unit by second D/A conversion that is different from the first D/A conversion in resolution; and synthesizing the gray-scale signals generated by the first D/A conversion with the correction signals generated by the second D/A conversion to generate the data signals.

BRIEF DESCRIPTION OF THE DRAWINGS

The invention will be described with reference to the accompanying drawings, wherein like numbers reference like elements, and wherein.

DETAILED DESCRIPTION OF EMBODIMENTS

Electro-optical Device

Figure 1:
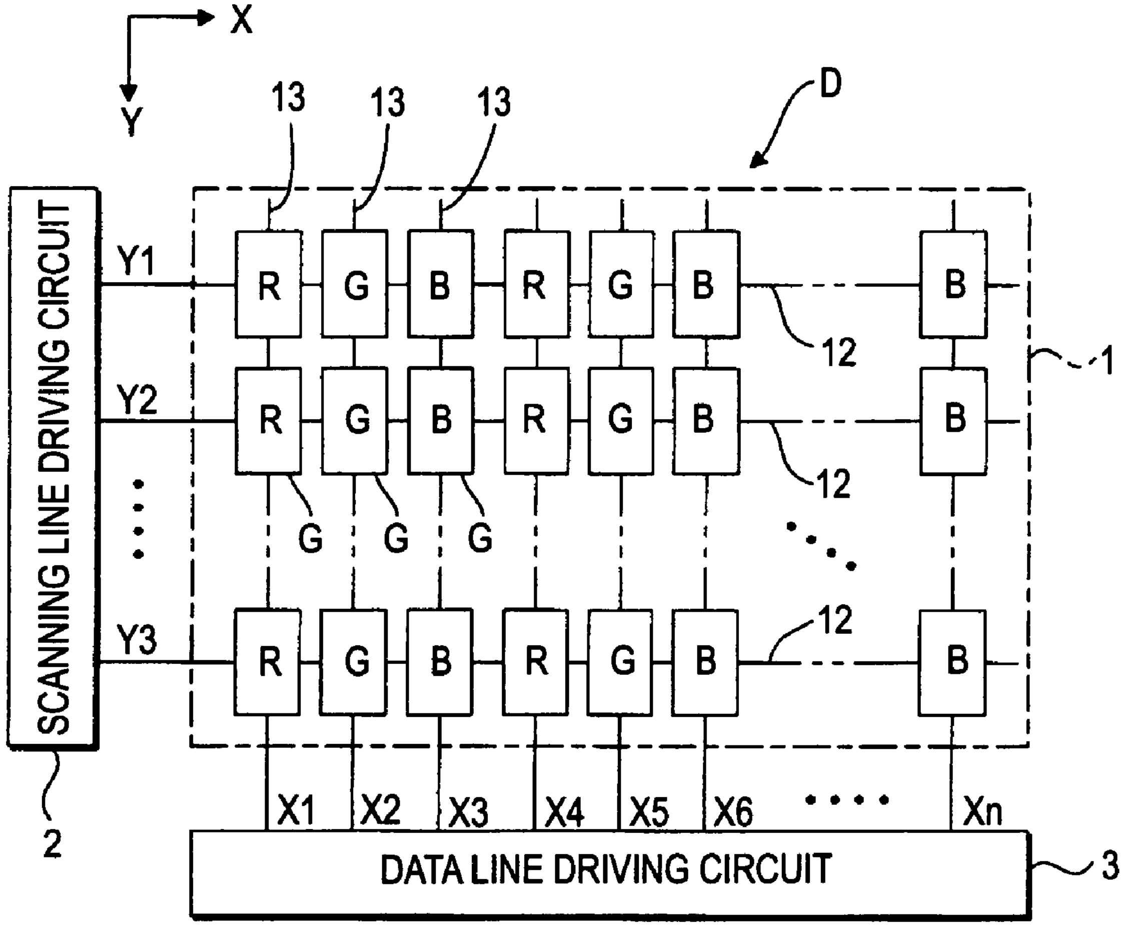
FIG. 1 is a block diagram showing the structure of an electro-optical device according to an embodiment of the invention.

An electro-optical device using OLED elements as electro-optical elements according to the invention will be described below. FIG. 1 is a block diagram showing the structure of the electro-optical device according to an embodiment of the invention. As shown in FIG. 1, an electro-optical device D includes an electro-optical panel 1 for displaying images and a scanning line driving circuit 2 and a data line driving circuit 3 for driving the electro-optical panel 1. The electro-optical panel 1 has m scanning lines 12 that extend in the X direction (row direction) and that are connected to the scanning line driving circuit 2 and n data lines 13 that extend in the Y direction (column direction) perpendicular to the X direction and that are connected to the data line driving circuit 3. Pixel circuits G are provided at intersections of the scanning lines 12 and the data lines 13, respectively. These pixel circuits G are arranged in a matrix of m rows and n columns in the X and Y directions. Each of the pixel circuits G includes an OLED element which emits a light component corresponding to any one of the three primary colors R, G, and B. In this embodiment, the pixel circuits G having the same emission color are arranged in the Y direction (a so-called stripe arrangement).

The scanning line driving circuit 2 is a circuit for sequentially selecting the scanning lines. More specifically, the scanning line driving circuit 2 outputs, to the scanning lines 12, scanning signals Y1, Y2, Y3, . . . , Ym which sequentially turn to active levels every horizontal scanning period. Meanwhile, the data line driving circuit 3 outputs, to the data lines 13, data signals X1, X2, X3, . . . , Xn corresponding to gray-scale levels to be displayed by the pixel circuits G in a period in the scanning lines 12 are selected, respectively. The OLED elements of the pixel circuits G corresponding to the scanning line 12 selected by the scanning line driving circuit 2 emit light with brightness corresponding to a data signal Xj (where j is an integer satisfying $1 \leqq j \leqq n$) that is supplied through the data line 13. In FIG. 1, the scanning line driving circuit 2 and the data line driving circuit 3 are separately provided from the electro-optical panel 1. However, the scanning line driving circuit 2 and the data line driving circuit 3 may be mounted on (built in) the electro-optical panel 1.

Figure 2:
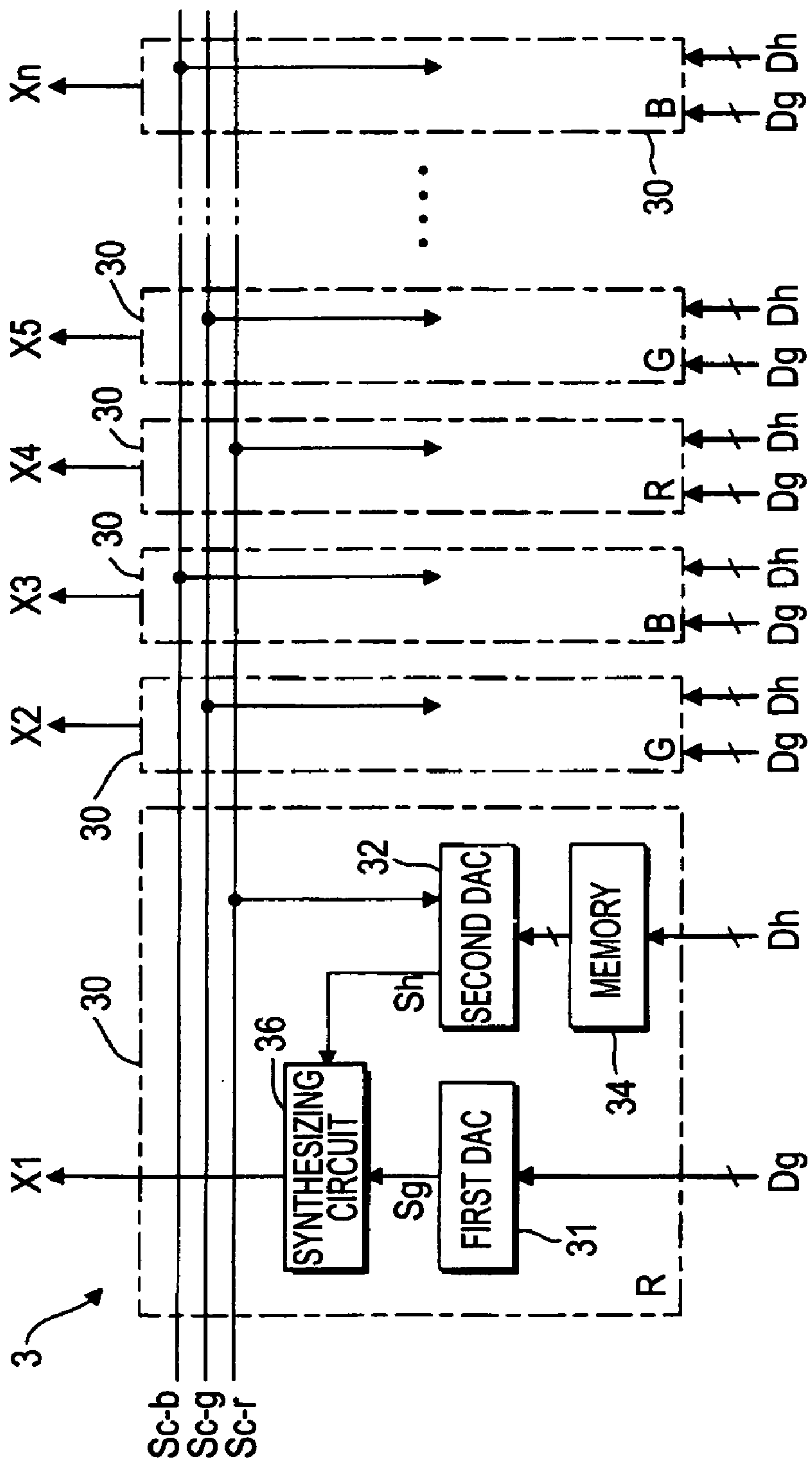
FIG. 2 is a block diagram showing the structure of a data line driving circuit of the electro-optical device.

FIG. 2 is a block diagram illustrating the structure of the data line driving circuit 3. As shown in FIG. 2, the data line driving circuit 3 has n signal processing circuit 30 corresponding to different data lines 13. Aj-th signal processing circuit 30 generates the data signal Xj corresponding to gray-scale data Dg and then outputs it to the data line 13. The gray-scale data Dg is, for example, 8-bit digital data for designating the brightness (gray-scale level) of the OLED element in each pixel circuit G, and is supplied to the data line driving circuit 3 from an external device, such as a CPU of an electronic apparatus having the electro-optical device D mounted thereon. FIG. 2 shows the detailed structure of only a first signal processing circuit 30, but the other signal processing circuits 30 have the same structure as that of the first signal processing circuit. Therefore, the structure of the first signal processing circuit 30 will be described below, and a detailed description of the other signal processing circuits 30 will be omitted for the convenience of explanation.

A first DAC (digital to analog converter) 31 and a second DAC 32 shown in FIG. 2 are units for converting digital data into an analog signal. The first DAC 31 converts digital gray-scale data Dg supplied from an external device into an analog gray-scale signal Sg. In addition, a memory 34 is provided to the front stage of the second DAC 32. The memory 34 of this embodiment is a RAM for storing correction data Dh. The correction data Dh is 8-bit digital data indicating the degree of correction (the amount of correction) to be performed on a gray-scale signal Sg, and is supplied from an external device to the respective signal processing circuits 30 to be written onto the memory. More specifically, the correction data Dh is supplied at the timing immediately after power is applied to the electro-optical device D or at the timing within a blocking period, such as a horizontal retrace period or a vertical retrace period, to be written onto the memory 34. The second DAC 32 converts the correction data Dh stored in the memory 34 into an analog correction signal Sh. In addition, a synthesizing circuit 36 synthesizes the gray-scale signal Sg generated by the first DAC 31 and the correction signal Sh generated by the second DAC 32 to generate a data signal X1. The data signal X1 is a signal obtained by correcting the gray-scale signal Sg corresponding to the gray-scale data Dg based on the correction signal Sh corresponding to the correction data Dh (the other data signals X2 to Xn are obtained in the same manner).

As shown in FIG. 2, the data line driving circuit 3 is supplied with three types of resolution adjustment signals Sc (Sc-r, Sc-g, and Sc-b) corresponding to different display colors from an external device. The resolution adjustment signal Sc-r is supplied to the second DAC 32 of the signal processing circuit 30 corresponding to the red pixel circuit G, and the resolution adjustment signal Sc-g is supplied to the second DAC 32 of the signal processing circuit 30 corresponding to the green pixel circuit G. In addition, the resolution adjustment signal Sc-b is supplied to the second DAC 32 of the signal processing circuit 30 corresponding to the blue pixel circuit G. These resolution adjustment signals Sc adjust the resolution of the second DAC 32. In this embodiment, the term 'resolution of DAC (the first and second DACs 31 and 32)' means the variation of an analog signal when a least significant bit of the digital data varies, that is, the minimum value of the variation of the analog signal output from the DAC. That is, the resolution of the first DAC 31 means the variation of the gray-scale signal Sg when a least significant bit of the gray-scale data Dg varies, and the resolution of the second DAC 32 means the variation of the correction signal Sh when a least significant bit of the correction data Dh varies. In this embodiment, the resolution of the second DAC 32 is adjusted according to the resolution adjustment signals Sc input to the second DAC 32, regardless of the resolution of the first DAC 31. Therefore, the resolution of the second DAC 32 is different from that of the first DAC 31. As such, when the resolution of the second DAC 32 is adjusted according to the resolution adjustment signals Sc, the characteristics of correction to be performed on the gray-scale signal Sg generated by the first DAC 31 vary. That is, in this embodiment, the characteristics of correction to be performed on the gray-scale signal Sg are determined by the correction data Dh and the resolution adjustment signals Sc. More specifically, the resolution adjustment signals Sc are factors for adjusting the gray-scale characteristic of the entire electro-optical panel 1 having a plurality of pixel circuits G therein for every display color, and the correction data Dh is a factor for separately adjusting the gray-scale characteristics of these pixel circuits G for every row.

As described above, in this embodiment, the correction signal Sh is generated from the correction data Dh by the second DAC 32 whose resolution is independently selected from the first DAC 31. Therefore, it is possible to accurately correct the gray-scale level of each pixel circuit G, compared to the related art in which the gray-scale data Dg is added to the correction data Dh and then D/A conversion is performed on the added data. For example, when the resolution of the second DAC 32 is set higher than that of the first DAC 31, it is possible to adjust the gray-scale signal Sg by the amount of correction which is sufficiently smaller than the minimum value of the level variation of the gray-scale signal Sg. In other words, it is possible to select the resolution of the first DAC 31, regardless of the resolution required for the second DAC 32 in order to perform the optimum correction. Therefore, even if the resolution must be sufficiently raised to perform correction, the resolution capable of obtaining the desired gray-scale signal Sg from the gray-scale data Dg is sufficient for the first DAC 31. Therefore, according to this embodiment, it is possible to perform accurate correction using the first DAC 31 while preventing an increase in the size of a circuit and a complicated circuit structure.

Further, in this embodiment, the resolution of the second DAC 32 can be adjusted by the resolution adjustment signals Sc, which makes it possible to effectively adjust the gray-scale characteristic of the entire electro-optical panel 1. Particularly, in this embodiment, the resolution of the second DACs 32 in the signal processing circuits 30 corresponding to the respective display colors is adjusted according to the three types of resolution adjustment signals Sc (Sc-r, Sc-g, and Sc-b) corresponding to different display colors. Therefore, it is possible to easily adjust the white balance of the entire electro-optical panel 1 by performing correction on every display color.

Furthermore, a RAM is used as the memory 34 for storing the correction data Dh. Therefore, even if the characteristics of each element of the electro-optical device D (for example, the characteristics of each pixel circuit G, the OLED element included in the pixel circuit G, and the first and second DACs 31 and 32) vary with the elapse of time, it is possible to always perform the optimum correction on the gray-scale characteristic of the electro-optical panel 1 by updating the correction data Dh of the memory, corresponding to the varied characteristics of the elements. However, a ROM may be used as the memory 34. In this case, for example, the correction data Dh is previously written in the memory 34 before the manufacture or shipment of the electro-optical device D, and thus it is not necessary to update the content of the memory 34 after the variation in characteristics. Structure of first and second DACs 31 and 32

Next, the structure of the first and second DACs 31 and 32 will be described in detail.

A circuit for outputting an analog signal from digital data includes a current-output-type DAC for outputting a current signal having a current value corresponding to digital data, a voltage-output-type DAC for outputting a voltage signal having a voltage value corresponding to digital data, and a pulse-output-type DAC for outputting a pulse signal having a pulse width corresponding to digital data. Hereinafter, a description will be made of a structure in which these DACs are used as the first DAC 31 and the second DAC 32 and the structure of the synthesizing circuit 36 in this case.

Current-output-type DAC

Figure 3:
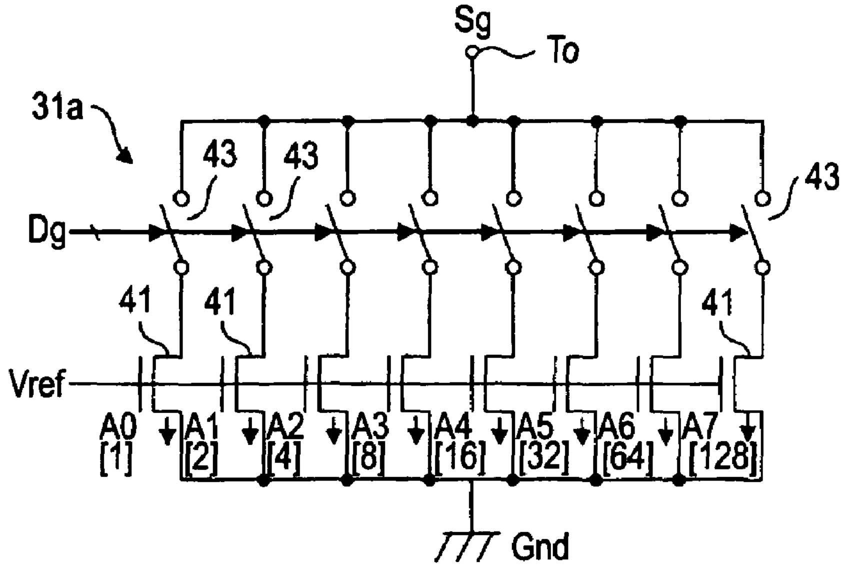
FIG. 3 is a circuit diagram showing the structure of a first current-output-type DAC.

FIG. 3 is a circuit diagram illustrating the structure of the first current-output-type DAC. As shown in FIG. 3, a first DAC 3 la has eight transistors 41 respectively corresponding to the bits of the gray-scale data Dg and switches 43 respectively connected to drain electrodes of the transistors 41. A source electrode of each transistor 41 is connected to the ground. In addition, a predetermined constant reference voltage Vref is applied to gate electrodes of all the transistors 41. The characteristics (particularly, a threshold voltage) of the transistors 41 are selected such that each of currents A0 to A7 flowing through the transistors 41 when the common reference voltage Vref is applied to the gate electrodes has a magnitude obtained by weighting the n-th power of 2. More specifically, as shown in FIG. 3, the ratio of the currents A0 to A7 flowing through the respective transistors 41 in the first to eighth stages is A0:A1:A2:A3:A4:A5:A6:A7=1:2:4:8:16:32:64:128. That is, these transistors 41 function as a current source for generating the plurality of currents A0 to A7 to which different weight values are weighted, respectively.

Meanwhile, an end of each of the switches 43 opposite to the transistor 41 is commonly connected to the terminal T0 to which the gray-scale signal Sg is output. Each switch 43 is selectively switched in response to the bit corresponding to the switch 43 among the gray-scale data Dg. For example, the first switch 43 is turned on if the least significant bit of the gray-scale data Dg is '1', but is turned off if the least significant bit is '0'. In this structure, if one or more switches 43 among the eight switches 43 are turned on in response to the gray-scale data Dg, the current flows through one or more transistors 41 corresponding to the switches 43, and a current signal obtained by adding the currents is supplied to the output terminal To as the gray-scale signal Sg.

Figure 4:
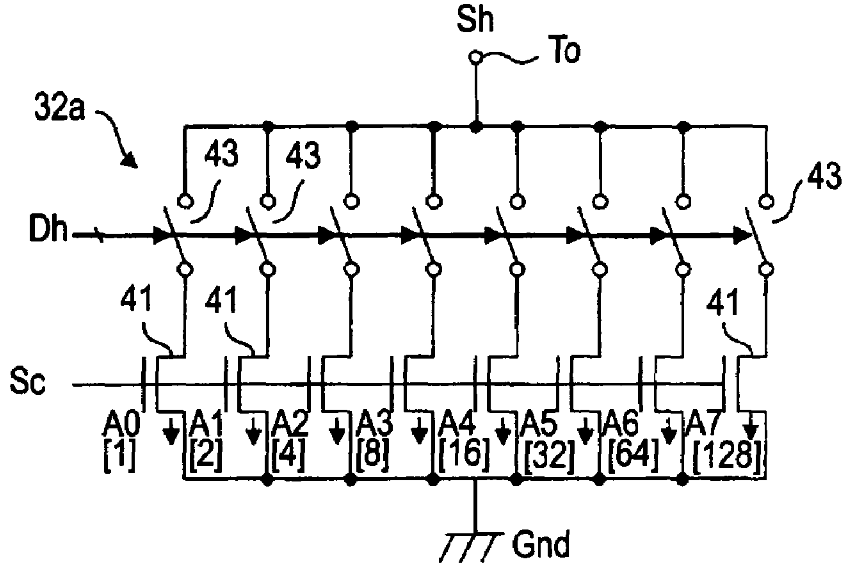
FIG. 4 is a circuit diagram showing the structure of a second current-output-type DAC.

Next, FIG. 4 is a circuit diagram illustrating the structure of a second current-output-type DAC. In FIG. 4, components having the same functions as those in FIG. 3 have the same reference numerals. As shown in FIG. 4, a second DAC 32*a* has the same structure as the first DAC 31*a* except that the switching of each switch 43 is controlled in response to the correction data Dh and the resolution adjustment signal Sc (any one of Sc-r, Sc-g, and Sc-b) are commonly supplied to the gate electrodes of the respective transistors 41. In this structure, if one or more switches 43 among the eight switches 43 are turned on in response to the correction data Dh, the current flows through one or more transistors 41 corresponding to the switches 43, and a current signal obtained by adding the currents is supplied to the output terminal To as the gray-scale signal Sg. Here, the structure of the second DAC 32*a* is the same as that of the first DAC 31*a* in that the currents A0 to A7 passing through the transistors 41 are weighted with different weight values. However, in the second DAC 32*a*, the voltage of the gate electrode, which is the reference of this current, turns to the level of the resolution adjustment signal Sc. Therefore, the value of current passing through each transistor 41 is varied by adjusting the level of the resolution adjustment signal Sc (however, the ratio of currents is not varied), which causes the resolution of the second DAC 32*a* to be changed.

Figure 5:
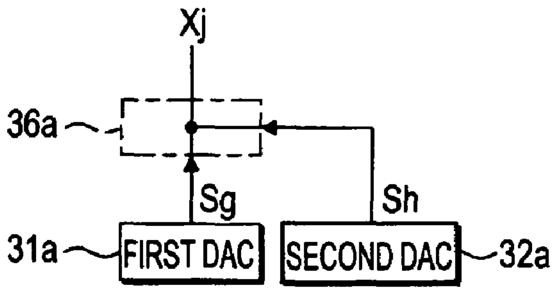
FIG. 5 is a block diagram showing the structure of a synthesizing circuit when the first DAC and the second DAC are of current output types.

FIG. 5 is a block diagram illustrating the structure of the signal processing circuit 30 using the first and second current-output-type DACs 31*a* and 32*a*, paying attention to the synthesizing circuit 36. As shown in FIG. 5, in a synthesizing circuit 36*a*, an output terminal To of the first DAC 31*a* and an output terminal To of the second DAC 32*a* are connected to each other. The data signal Xj output from the signal processing circuit 30 is a current signal obtained by adding the gray-scale signal Sg output from the first DAC 31*a* and the correction signal Sh output from the second DAC 32*a*. That is, the synthesizing circuit 36*a* serves as a unit for adding the gray-scale signal Sg and the correction signal Sh. As such, when both the first DAC 31 and the second DAC 32*a* are of current output types, the structure of the synthesizing circuit 36*a* can be simplified.

Voltage-output-type DAC

Figure 6:
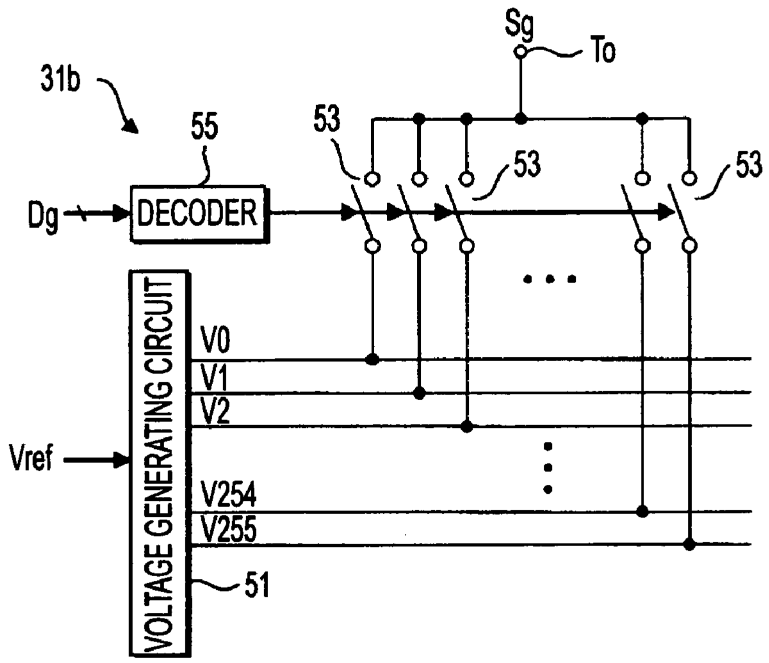
FIG. 6 is a circuit diagram showing the structure of a first voltage-output-type DAC.

FIG. 6 is a block diagram illustrating the structure of a first voltage-output-type DAC. As shown in FIG. 6, a first DAC 31*b* includes a voltage generating circuit 51, 256switches 53, and a decoder 55. The voltage generating circuit 51 divides the reference voltage Vref supplied from an external device to generate 256 kinds of voltages V0 to V255. Meanwhile, an end of each switch 53 is connected to any one of 256 output terminals of the voltage generating circuit 51 from which voltages V0 to V255 are output. The other ends of these switches 53 are commonly connected to the output terminal To of the gray-scale signal Sg. The decoder 55 decodes the gray-scale data Dg to generate a signal for selectively causing one of the switches 53 to be turned on. In this structure, when the switch 53 corresponding to the gray-scale data Dg is turned on, one of the voltage V0 to V255 corresponding to the switch 53 is supplied to the output terminal To as the gray-scale signal Sg.

Figure 7:
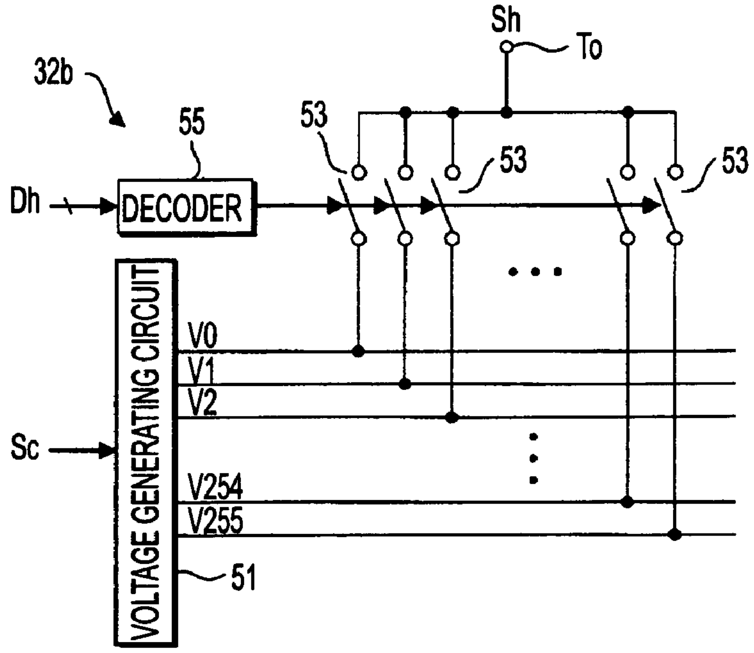
FIG. 7 is a block diagram showing the structure of a second voltage-output-type DAC.

Next, FIG. 7 is a block diagram illustrating the structure of a second voltage-output-type DAC. In FIG. 7, components having the same functions as those in FIG. 6 have the same reference numerals. As shown in FIG. 7, a second DAC 32*b* has the same structure as the first DAC 31*b* except that the switching of the respective switches 53 is controlled according to the result obtained by decoding the correction data Dh and the resolution adjustment signal Sc is supplied to the voltage generating circuit 51. In this structure, when one of the switches 53 corresponding to the result obtained by decoding the correction data Dh is turned on, the voltage (one of the voltages V0 to V255) corresponding to the switch 53 is supplied to the output terminal To as the correction signal Sh.

Figure 8:
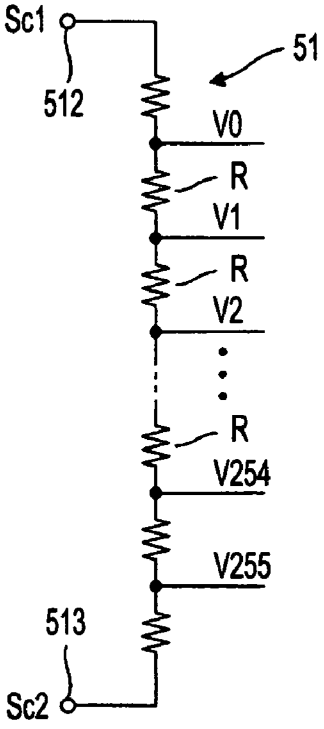
FIG. 8 is a block diagram showing the structure of a voltage generating circuit of the second voltage-output-type DAC.

FIG. 8 is a circuit diagram illustrating the detailed structure of the voltage generating circuit 51 of the second DAC 32*b*. As shown in FIG. 8, the voltage generating circuit 51 has a plurality resistors R that are connected to each other in series between a terminal 512 and a terminal 513, and the voltages V0 to V255 are respectively obtained from midpoints between adjacent resistors R. Meanwhile, the resolution adjustment signal Sc includes two types of signals (Sc1 and Sc2) having different voltage levels. The signal Sc1 is applied to the terminal 512, and the signal Sc2 is applied to the terminal 513. Therefore, the reference of the voltages V0 to V255 is the level of the resolution adjustment signal Sc. That is, the difference in potential between the voltages V0 to V255 is varied by adjusting the level of the resolution adjustment signal Sc, which causes the resolution of the second DAC to be changed.

Figure 9:
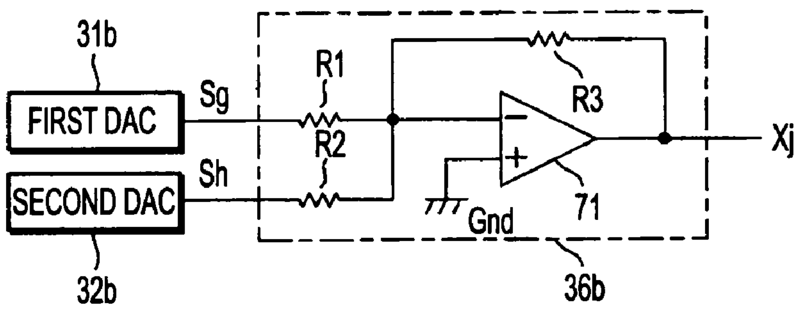
FIG. 9 is a block diagram showing the structure of a synthesizing circuit when the first DAC and the second DAC are of voltage output types.

FIG. 9 is a block diagram illustrating the structure of the signal processing circuit 30 using the first and second DACs 31*b* and 32*b* of a voltage output type, paying attention to the synthesizing circuit 36. As shown in FIG. 9, a synthesizing circuit 36*b* is a circuit for adding the gray-scale signal Sg and the correction signal Sh, both being voltage signals, and includes an operational amplifier 71 of which a positive input terminal is connected to the ground, two resistors R1 and R2 provided between a negative input terminal of the operational amplifier 71 and the first and second DACs 31*b* and 32*b*, and a resistor R3 provided between the negative input terminal and an output terminal of the operational amplifier 71. In this structure, the data signal Xj output from the synthesizing circuit 36*b* (more specifically, from the operational amplifier 71) is a voltage signal obtained by adding the gray-scale signal Sg output from the first DAC 31*b* and the correction signal Sh output from the second DAC 32*b*.

Pulse-output-type DAC

Figure 10:
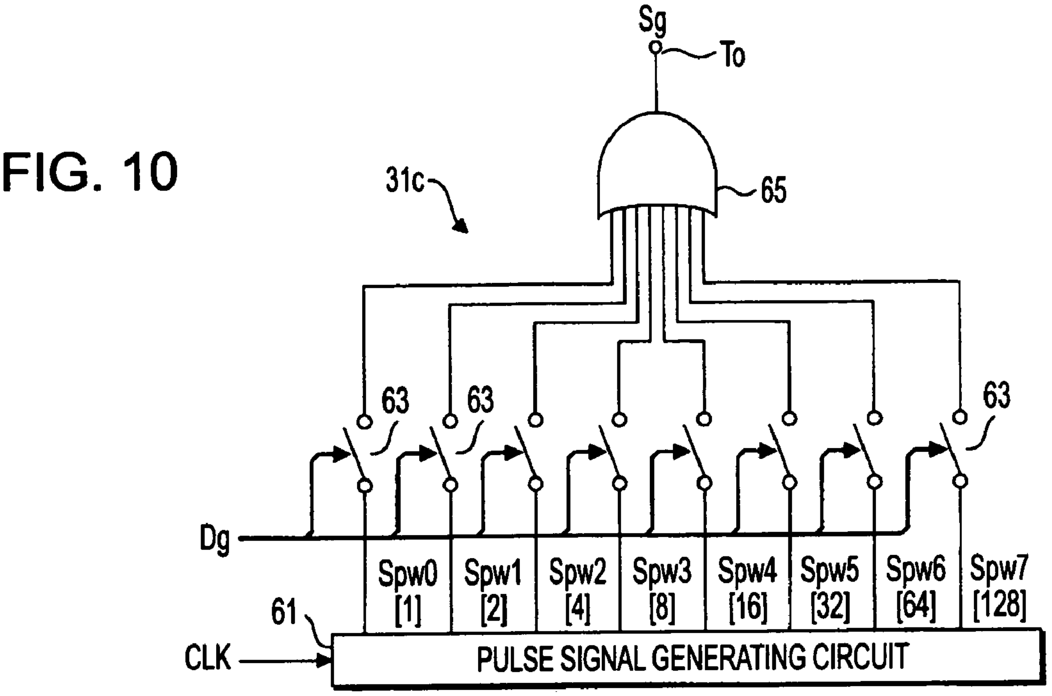
FIG. 10 is a block diagram showing the structure of a first pulse-output-type DAC.
Figure 12:
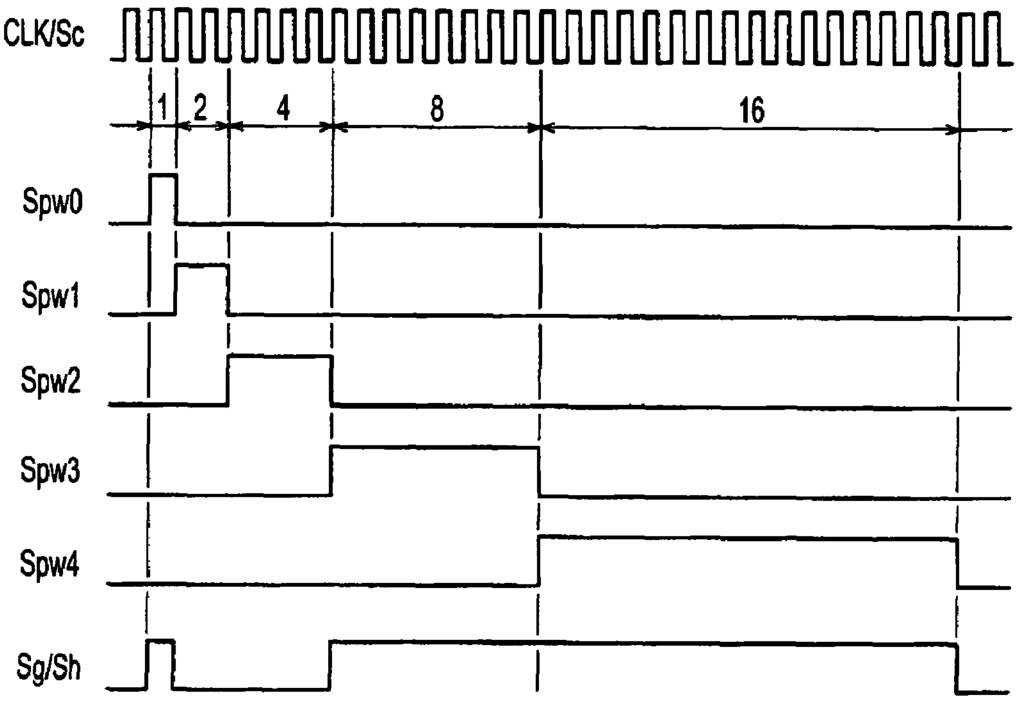
FIG. 12 is a timing chart illustrating the operation of a pulse-output type DAC.

FIG. 10 is a block diagram illustrating the structure of a first pulse-output-type DAC. As shown in FIG. 10, a first DAC 31*c* includes a pulse signal generating circuit 61 to which a clock signal CLK whose level repeatedly varies in a predetermined period is input, eight switches 63 respectively corresponding to bits of the gray-scale data Dg, and an OR circuit 65 outputting the gray-scale signal Sg. The pulse signal generating circuit 61 properly divides the clock signal CLK input from an external device to generate eight types of pulse signals Spw (Spw0 to Spw7). As shown in FIG. 12, the respective pulse signals Spw are signals having pulse widths to which different weight values are weighted. For example, the pulse signal Spw0 has a pulse width equal to the period of the clock signal CLK, and the pulse signal Spw1 has a pulse width which is twice the period of the clock signal CLK. The pulse signal Spw2 has a pulse width which is four times the period of the clock signal CLK. More specifically, the ratio of the pulse widths of the pulse signals Spw0 to Spw7 is Spw0:Spw1:Spw2:Spw3:Spw4:Spw5:Spw6:Spw7=1:2:4:8:16:32:64:128. In addition, the periods in which the respective pulse signals Spw turn to active levels (H levels) are not superposed with each other.

The pulse signals Spw are supplied to one end of each of the corresponding switches 63. The other ends of the switches 63 are connected to an input terminal of the OR circuit 65. Each switch 63 is selectively turned on or off in response to the bit of the gray-scale data Dg corresponding to the switch 63. For example, the first switch 63 corresponding to the pulse signal Spw0 is turned on if the least significant bit of the gray-scale data Dg is '1', but is turned off if the least significant bit is '0'. In this structure, if one or more switches 63 among the eight switches 63 are turned on in response to the gray-scale data Dg, the pulse signals Spw corresponding to the switches 63 are supplied to the OR circuit 65. Then, the OR circuit 65 adds these pulse signals Spw to obtain a voltage signal and then supplies the voltage signal to the output terminal To as the gray-scale signal Sg. Therefore, the gray-scale signal Sg has the pulse width corresponding to the gray-scale data Dg. The gray-scale signal Sg obtained by adding the pulse signals Spw0, Spw3, and Spw4 (that is, when the gray-scale data Dg is '00011001') is shown on the lowermost side of FIG. 12.

Figure 11:
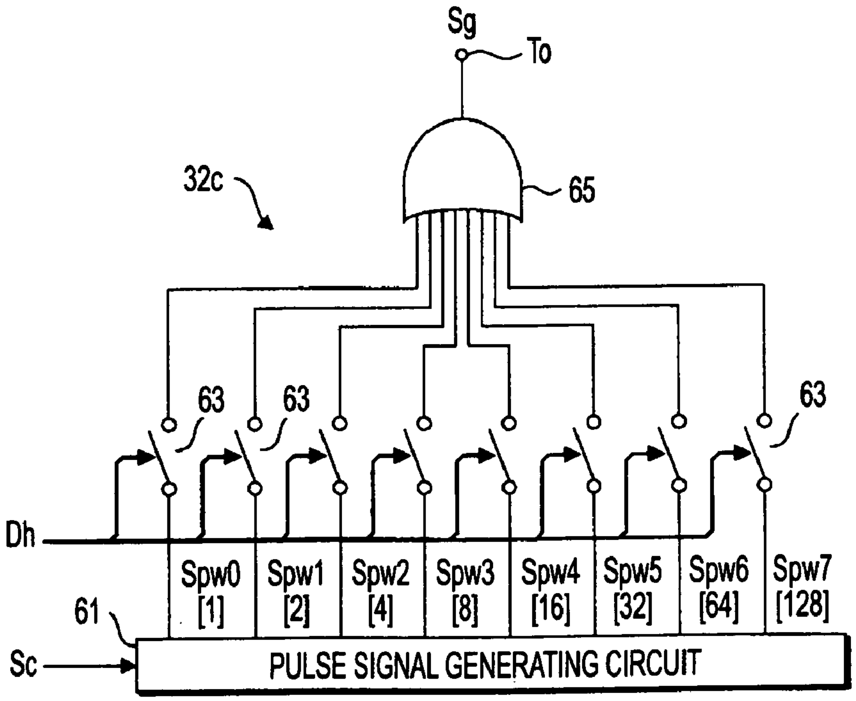
FIG. 11 is a block diagram showing the structure of a second pulse-output-type DAC.

Meanwhile, FIG. 11 is a block diagram illustrating the structure of a second pulse-output-type DAC. In FIG. 11, components having the same functions as those in FIG. 10 have the same reference numerals. As shown in FIG. 11, a second DAC 32*c* has the same structure as the first DAC 31*c* except that the switching of the respective switches 63 is controlled according to each bit of the correction data Dh and the resolution adjustment signals Sc are supplied to the pulse generating circuit 61. As shown in FIG. 12, the resolution adjustment signals Sc are clock signals whose levels repeatedly vary. In this structure, if one or more switches 63 among the eight switches 63 are turned on in response to the correction data Dh, the pulse signals Spw corresponding to the switches 63 are supplied to the OR circuit 65. Then, the OR circuit 65 adds these pulse signals Spw to supply the added signal to the output terminal To as the correction signal Sn. Therefore, similar to the gray-scale signal Sg, the correction signal Sh is a voltage signal obtained by adding the pulse signals Spw0, Spw3, and Spw4 selected by the correction data Dh, as shown on the lowermost side of FIG. 12.

Figure 13:
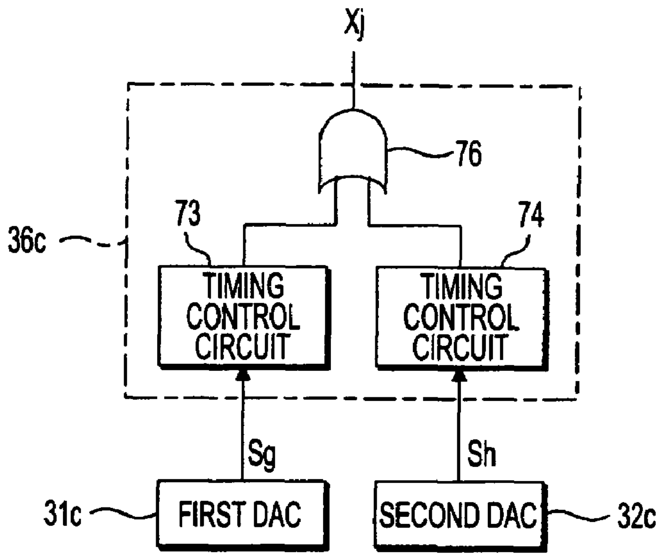
FIG. 13 is a block diagram showing the structure of a synthesizing circuit when the first DAC and the second DAC are of pulse output types.
Figure 14:
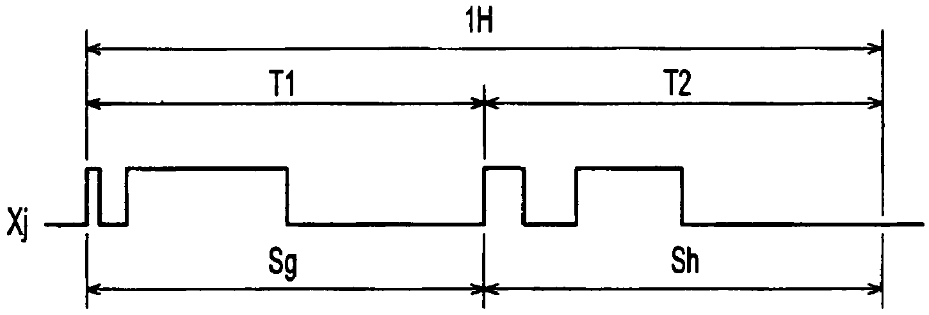
FIG. 14 is a timing chart illustrating the operation of the synthesizing circuit.

FIG. 13 is a block diagram illustrating the structure of the signal processing circuit 30 using the first and second DACs 31*c* and 32*c* of a pulse output type, paying attention to the synthesizing circuit 36. As shown in FIG. 13, a synthesizing circuit 36*c* includes a timing control circuit 73 to which the gray-scale signal Sg is input from the first DAC 31*c*, a timing control circuit 74 to which the correction signal Sh is input from the second DAC 32*c*, and an OR circuit 76 that outputs the logical sum of signals respectively output from the timing control circuits 73 and 74 as the data signal Xj. The timing control circuits 73 and 74 each properly delay signals input thereto and then output them. More specifically, as shown in FIG. 14, the timing control circuit 73 outputs the gray-scale signal Sg supplied from the first DAC 31*c* to the OR circuit 76 in a first half period T1 of one horizontal scanning period. On the other hand, the timing control circuit 74 outputs the correction signal Sh supplied from the second DAC 32*c* to the OR circuit 76 in a letter half period T2 of one horizontal scanning period. Then, the OR circuit 76 adds the signals respectively output from the timing control circuits 73 and 74. Therefore, as shown in FIG. 14, a voltage signal which turns to the active level in a portion of the one horizontal scanning period corresponding to the gray-scale data Dg and the correction data Dh is output from the synthesizing circuit 36 as the data signal Xj. FIG. 14 shows an illustrative example in which the period T1 and the period T2 have the same time length. However, the time lengths in the respective periods may be properly adjusted. For example, the period T2 has a time length shorter than that of the period T1.

Structure of Pixel Circuit G

As described above, the first and second DACs 31 and 32 shown in FIG. 2 are of any one of a current output type (31*a* and 32*a*), a voltage output type (31*b* and 32*b*), and a pulse output type (31*c* and 32*c*). The data signal Xj output to the respective data lines 13 becomes a current signal or voltage signal according to the types of the first and second DACs 31 and 32. Hereinafter, description will be made of the structure of the pixel circuit G when the data signal Xj is a current signal (that is, both the first DAC 31 and the second DAC 32 are of current output types) and the structure of the pixel circuit G when the data signal Xj is a voltage signal (that is, both the first DAC 31 and the second DAC 32 are of voltage output types or pulse output type). In addition, the structure of a pixel circuit G located in an i-th row (where i is an integer satisfying $1 \leqq i \leqq m$) and a j-th column will be described below, but all pixel circuits G have the same structure. In addition, the invention is not limited to the following structure of the pixel circuit G.

Current Driving Pixel Circuit G

Figure 15:
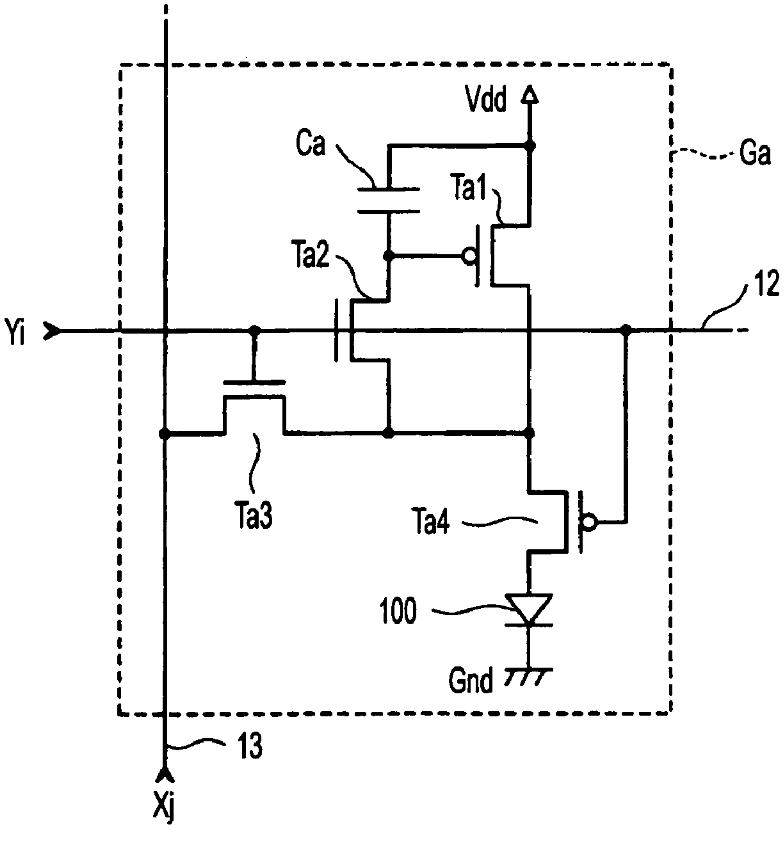
FIG. 15 is a circuit diagram showing the structure of a current driving pixel circuit.

FIG. 15 is a circuit diagram illustrating the structure of the pixel circuit G used when the data signal Xj is a current signal. As shown in FIG. 15, a pixel circuit Ga includes four transistors Ta1 to Ta4, a capacitive element Ca, and an OLED element 100. A source electrode of the p-channel transistor Ta1 is connected to a power line to which a high potential Vdd is applied from a power source. A drain electrode of the transistor Ta1 is connected to a source electrode of the p-channel transistor Ta4, a source electrode of the n-channel transistor Ta2, and a drain electrode of the n-channel transistor Ta3. A gate electrode of the transistor Ta4 is connected to the scanning line, and a drain electrode thereof is connected to an anode of the OLED element 100. A cathode of the OLED element 100 is connected to the ground (GND). An end of the capacitive element Ca is connected to a source electrode of the transistor Ta1, and the other end thereof is connected to a gate electrode of the transistor Ta1 and a drain electrode of the transistor Ta2. A gate electrode of the transistor Ta2 and a gate electrode of the transistor Ta3 are connected to the scanning line 12. In addition, a source electrode of the transistor Ta3 is connected to the data line 13.

In this structure, when a scanning signal Yi turns to an H level in an i-th horizontal scanning period of each vertical scanning period, the transistor Ta2 is turned on. Then, the gate electrode and the drain electrode of the transistor Ta1 are connected to each other, so that the transistor Ta1 functions as a diode. At that time, since the transistor Ta3 is also turned on, the current of the data signal Xj supplied to the data line 13 flows from the power line to the data line 13 via the transistors Ta1 and Ta3. Then, charges corresponding to the gate electrode of the transistor Ta1 are stored in the capacitive element Ca. Since the transistor Ta4 is turned on in this state, no current passes through the OLED element 100. When the scanning signal Yi turns to an L level as the horizontal scanning period elapsed, the transistors Ta2 and Ta3 are turned off, and the transistor Ta4 is turned on. In this case, since the voltage held in the capacitive element Ca is applied to the gate electrode of the transistor Ta1, the current corresponding to the data signal Xj having passed through the data line 13 in the previous horizontal scanning period flows through the OLED element 100 via the transistors Ta1 and Ta4 to emit light. As such, the OLED element 100 emits light with brightness corresponding to the data signal Xj, which is a current signal.

Voltage Driving Pixel Circuit G

Figure 16:
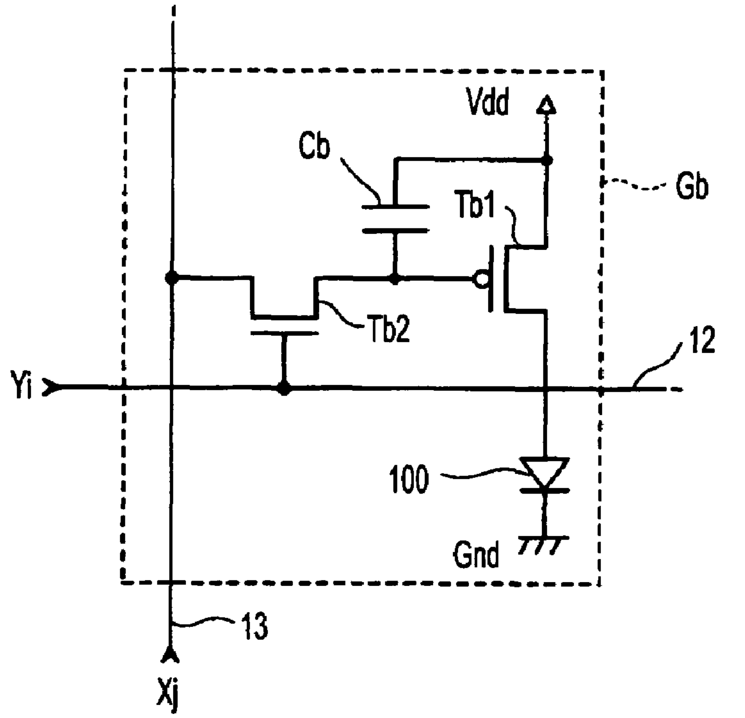
FIG. 16 is a circuit diagram showing the structure of a voltage driving pixel circuit.

FIG. 16 is a circuit diagram illustrating the structure of a pixel circuit Gb used when the data signal Xj is a voltage signal (in the embodiment, it is assumed that both the first DAC 31 and the second DAC 32 are of voltage output types). As shown in FIG. 16, the pixel circuit Gb includes two transistors Tb1 and Tb2, a capacitive element Cb, and an OLED element 100. A source electrode of the p-channel transistor Tb1 is connected to the power line to which the high potential Vdd is applied from a power source, and a drain electrode thereof is connected to an anode of the OLED element 100. A cathode of the OLED 100 is connected to the ground. In addition, a gate electrode of the transistor Tb1 is connected to a drain electrode of the n-channel transistor Tb2. A gate electrode of the transistor Tb2 is connected to the scanning line 12, and a source electrode thereof is connected to the data line 13. An end of the capacitive element Cb is connected to a source electrode of the transistor Tb1, and the other end thereof is connected to a gate electrode of the transistor Tb1 and a drain electrode of the transistor Tb2.

In this structure, when the scanning signal Yi turns to an H level in an i-th horizontal scanning period of each vertical scanning period, the transistor Tb2 is turned on. Then, charges corresponding to the voltage of the data signal Xj applied to the data line 13 are stored in the capacitive element Cb, and the current corresponding to the data signal Xj passes through the OLED element 100 to emit light. When the scanning signal Yi turns to an L level, the transistor Tb1 is turned off, and the voltage held in the capacitive element Cb is applied to the gate electrode of the transistor Tb1. Then, the current corresponding to the data signal Xj having passed through the data line 13 in the previous horizontal scanning period flows from the transistor Tb1 to the OLED element 100 to emit light. As such, the OLED element 100 emits light with brightness corresponding to the data signal Xj, which is a voltage signal. In addition, in the voltage driving pixel circuit Gb shown in FIG. 16, similar to the pixel circuit Ga shown in FIG. 15, the transistor Ta4 for defining the period when the OLED element 100 emits light may be provided between the anode of the OLED element 100 and the drain electrode of the transistor Ta1, and the gate electrode thereof may be connected to the scanning line 12.

In this embodiment, it is assumed that both the first DAC 31 and the second DAC 32 are of voltage output types. However, when they are of pulse output types, the same pixel circuit Gb is also used. In this case, in the i-th horizontal scanning period, the voltage corresponding to the pulse width of the data signal Xj is held in the capacitive element Cb, and is applied to the gate electrode of the transistor Tb1. Therefore, after the horizontal scanning period elapsed, the voltage held in the capacitive element Cb is applied to the gate electrode of the transistor Tb1. Thus, the OLED element 100 emits light with the brightness corresponding to the pulse width of the data signal Xj.

Modifications

Various modifications of the above-mentioned embodiments can be made. The detailed modifications are as follows. In addition, combinations of the following modifications can be executable.

Figure 17:
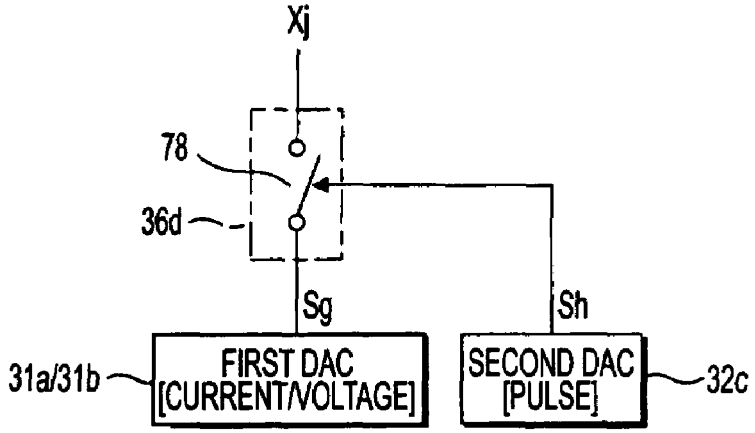
FIG. 17 is a block diagram showing the structure of a synthesizing circuit according to a modification.

(1) In the above-mentioned embodiments, the first DAC 31 and the second DAC 32 are of the same type. However, the first DAC 31 and the second DAC 32 may be used of different types. For example, as shown in FIG. 17, the signal processing circuit 30 may include the first current-output-type DAC 31*a* (or the first voltage-output-type DAC 31*b*) and the second pulse-output-type DAC 32*c*. In this structure, the synthesizing circuit 36*d* includes a switch 78, as shown in FIG. 17. An end of the switch 78 is connected to the output terminal To of the first DAC 31*a*, and the other end thereof is connected to the data line 13. Therefore, the switching of the switch 78 is controlled according to the correction signal Sh output from the second pulse-output-type DAC 32*c*. That is, the switch 78 is turned on when the correction signal Sh is at an H level, and is turned off when the correction signal Sh is at an L level. In this structure, the gray-scale signal Sg output from the first DAC 31*a* is output to the data line 13 only in the period in which the correction signal Sh output from the second DAC 32*c* is at the H level (that is, at the time corresponding to the pulse width that is determined according to the correction data Dh). That is, the synthesizing circuit 36*d* functions as a unit for multiplying the gray-scale signal Sg by the correction signal Sh (that is, for multiplying the level of the gray-scale signal Sg by the pulse width of the correction signal Sh). Therefore, the data signal Xj output from the synthesizing circuit 36*d* is corrected by the gray-scale signal Sg and the correction signal Sh.

Further, in the above-mentioned embodiment, a combination of the first current-output-type DAC 31*a* or the first voltage-output-type DAC 31*b* and the second pulse-output-type DAC 32*c* is used. However, the combination can vary. For example, the first pulse-output-type DAC 31*c* may be combined with the second current-output-type DAC 32*a* (or the second voltage-output-type DAC 32*b*) to constitute the signal processing circuit 30. In this structure, similar to the example shown in FIG. 17, the synthesizing circuit 36 functions as a unit for multiplying the gray-scale signal Sg, which is a pulse signal, by the correction signal Sh, which is a current signal (or a voltage signal). In addition, the types of the first and second DACs 31 and 32 are not limited to the current output type, the voltage output type, and the pulse output type. If necessary, any circuits capable of generating analog signals from digital data, such as the gray-scale data Dg or the correction data Dh, can be used as the first and second DACs 31 and 32, regardless of the detailed structure thereof.

Figure 18:
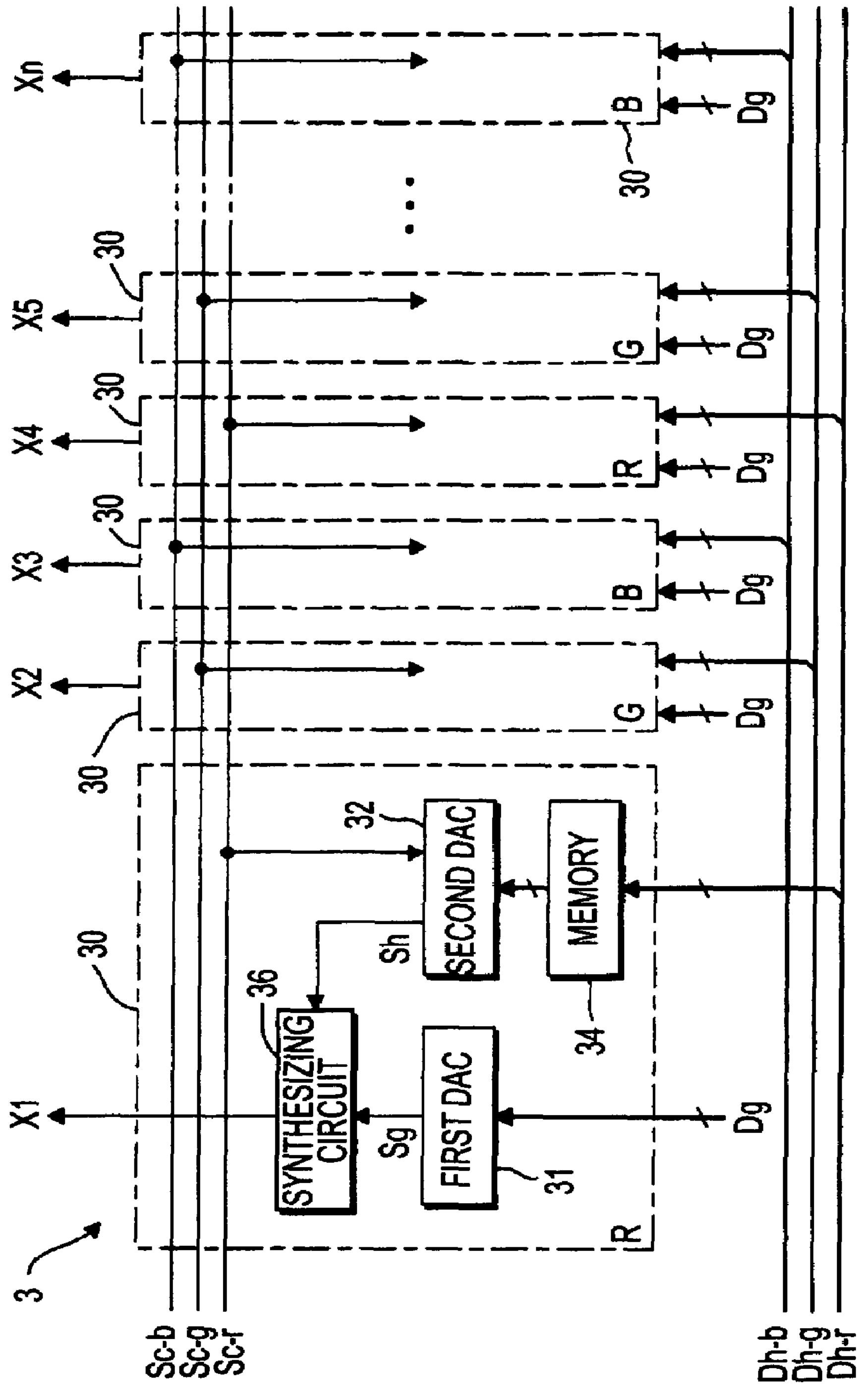
FIG. 18 is a block diagram showing the structure of a signal processing circuit according to a modification.

(2) In the above-mentioned embodiments, the correction data Dh is independently supplied to the respective signal processing circuits 30 corresponding to the pixels. However, as shown in FIG. 18, the common correction data Dh may be supplied to the signal process circuits 30 corresponding to the respective display colors. In FIG. 18, correction data Dh-r is commonly stored in the memories 34 of the signal processing circuits 30 respectively corresponding to the red pixel circuits G, and correction data Dh-g is commonly stored in the memories 34 of the signal processing circuits 30 respectively corresponding to the green pixel circuits G. In addition, correction data Dh-b is commonly stored in the memories 34 of the signal processing circuits 30 respectively corresponding to the blue pixel circuits G. This structure makes is possible to effectively correct the gray-scale characteristic of each display color and thus to maintain a good white balance. In addition, in FIG. 18, the memories 34 are provided in the signal processing circuits 30, respectively. However, the memories arranged for every display color may be commonly used by the signal processing circuits 30 corresponding to the respective display colors. That is, the memories 34 are not respectively provided in the signal processing circuits 30, but three memories for storing the correction data Dh (Dh-r, Dh-g, and Dh-b) of different display colors may be provided, and then the correction data Dh respectively output from the memories may be input to the second DACs 32 of the signal processing circuits 30 of the display colors, respectively.

(3) In the above-mentioned embodiments, the electro-optical device D having the OLED elements 100 as electro-optical elements is given as an example. However, the invention can be applied to different types of electro-optical devices D other than the above-mentioned electro-optical device. For example, the invention can be applied to various electro-optical devices, such as a liquid crystal display device, a field emission display (FED), a surface-conduction electron-emission display (SED), a ballistic electron surface emitting device (BSD), and a display device using light emitting diodes, an optical writing printer, and a writing head for an electronic duplicating machine, similar to the above-mentioned embodiments. As such, the electro-optical element of the invention is an element having a property to convert electrical energy into optical energy, or optical energy into electrical energy, and the invention can be applied to all devices equipped with this type of electro-optical element.

APPLICATIONS

Figure 19:
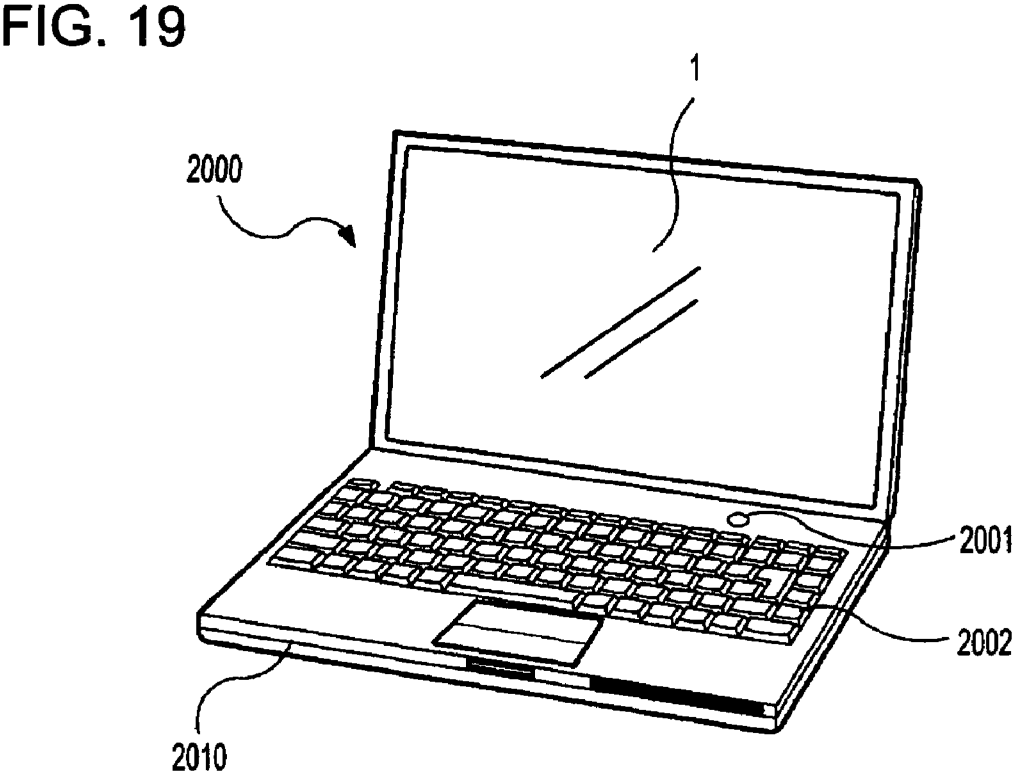
FIG. 19 is a perspective view showing the structure of a personal computer equipped with the electro-optical device.

Next, electronic apparatuses to which the electro-optical device according to the invention is applied will be explained. FIG. 19 is a perspective view illustrating the structure of a mobile personal computer including the electro-optical device D according to the above-mentioned embodiments as a display device. A personal computer 2000 has the electro-optical device D, serving as a display device, and a main body 2010. The main body 2010 is provided with a power supply switch 2001 and a keyboard 2002. Since the electro-optical device D uses the OLED elements 100, an image can be displayed on a screen at the wide viewing angle.

Figure 20:
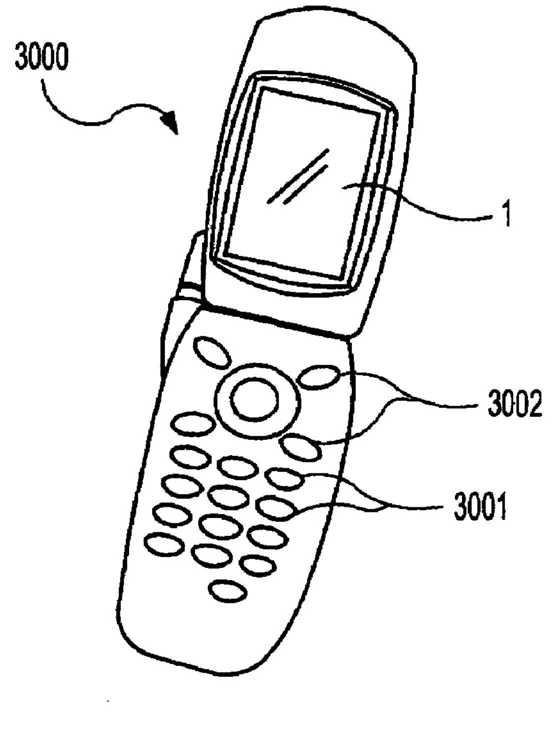
FIG. 20 is a perspective view showing the structure of a cellular phone equipped with the electro-optical device.

FIG. 20 shows the structure of a cellular phone including the electro-optical device D according to the above-mentioned embodiments. A cellular phone 3000 includes a plurality of operation buttons 3001, a scroll button 3002, and the electro-optical device D, serving as a display device. By operating the scroll button 3002, a screen displayed on the electro-optical device D is scrolled.

Figure 21:
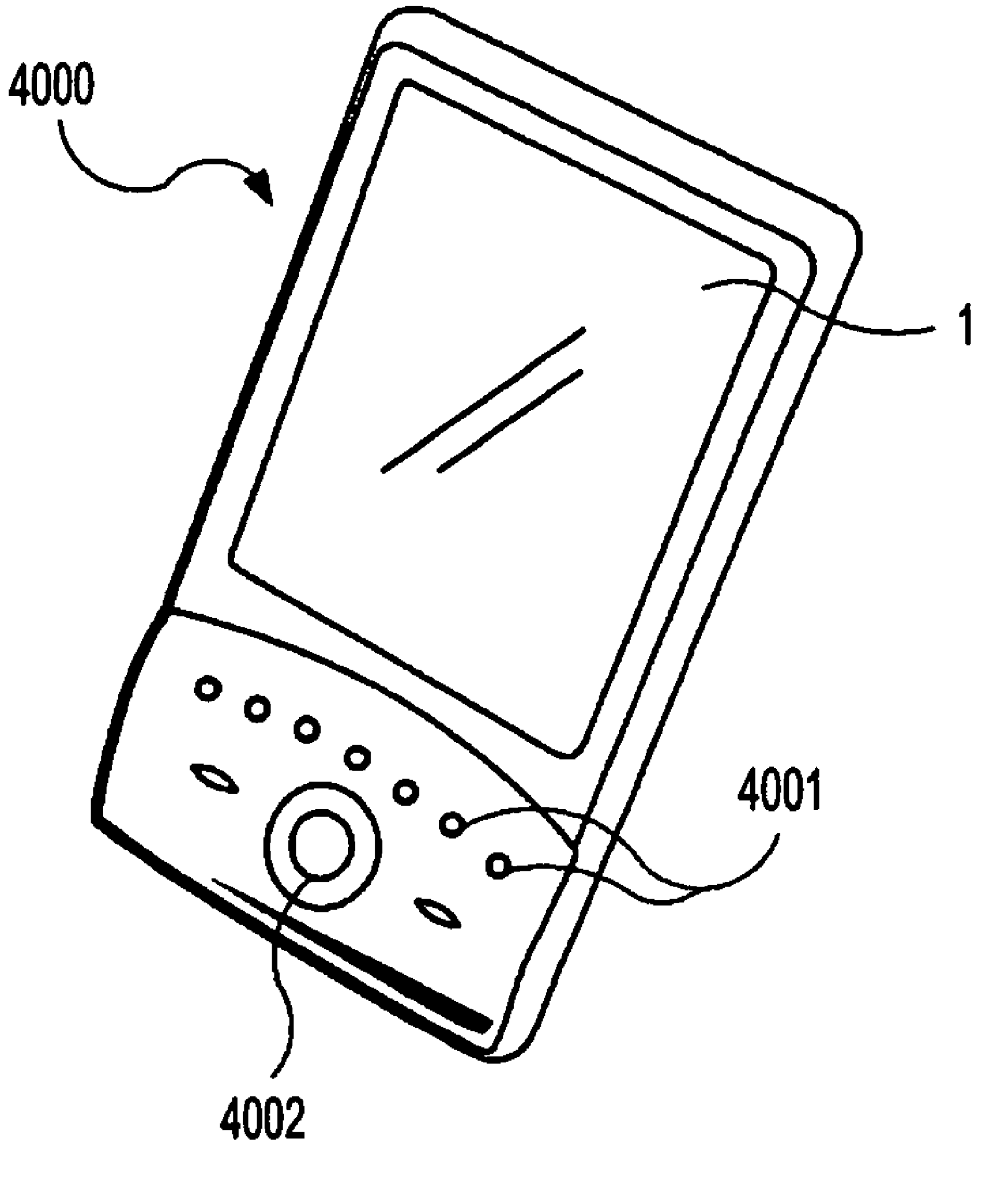
FIG. 21 is a perspective view showing the structure of a personal digital assistant equipped with the electro-optical device.

FIG. 21 shows the structure of a personal digital assistant (PDA) including the electro-optical device D according to the above-mentioned embodiments. A personal digital assistant 4000 includes a plurality of operation buttons 4001, a power supply switch 4002, and the electro-optical device D, serving as a display device. By operating the power supply switch 4002, various kinds of information items, such as an address book and a schedule book, are displayed on the electro-optical device D.

Further, the electro-optical device D according to the invention can be applied to various electronic apparatuses, such as a digital still camera, a television, a video camera, a car navigation apparatus, a pager, an electronic organizer, an electronic paper, an electronic calculator, a word processor, a workstation, a television phone, a POS terminal, a printer, a scanner, a duplicating machine, a video player, and apparatuses having a touch panel, in addition to the electronic apparatuses shown in FIGS. 19 to 21.

What is claimed is:

1. A signal processing circuit that generates data signals for controlling gray-scale levels of electro-optical elements, comprising:

a first D/A conversion unit that generates gray-scale signals from gray-scale data for designating the gray-scale levels of the electro-optical elements;

a storage unit that stores correction data indicating correction values with respect to the gray-scale signals;

a second D/A conversion unit that has resolution different from that of the first D/A conversion unit, and that generates correction signals from the correction data stored in the storage unit; and a synthesizing unit that synthesizes the gray-scale signals generated by the first D/A conversion unit with the correction signals generated by the second D/A conversion unit to generate data signals.

2. The signal processing circuit according to claim 1, wherein the synthesizing unit includes an adding unit that adds the gray-scale signals generated by the first D/A conversion unit and the correction signals generated by the second D/A conversion unit.

3. The signal processing circuit according to claim 2, wherein both the first D/A conversion unit and the second D/A conversion unit generate current signals or voltage signals.

4. The signal processing circuit according to claim 1, wherein the first D/A conversion unit generates the gray-scale signals having pulse widths corresponding to the gray-scale data, the second D/A conversion unit generates the correction signals having pulse widths corresponding to the correction data, and the synthesizing unit outputs the gray-scale signals in a first period, and outputs the correction signals in a second period subsequent to the first period.

5. The signal processing circuit according to claim 1, wherein the synthesizing unit includes a multiplier unit that multiplies the gray-scale signals generated by the first D/A conversion unit by the correction signals generated by the second D/A conversion unit.

6. The signal processing unit according to claim 5, wherein the first D/A conversion unit generates, as the gray-scale signals, current signals or voltage signals having levels corresponding to the gray-scale data, the second D/A conversion unit generates the correction signals having pulse widths corresponding to the correction data, and the synthesizing unit outputs, as the data signals, the gray-scale signals generated by the first D/A conversion unit in a period corresponding to the pulse width of the correction signal.

7. A data line driving circuit of an electro-optical device in which a plurality of electro-optical elements are respectively provided corresponding to intersections of a plurality of scanning lines and a plurality of data lines, comprising:

a plurality of signal processing circuits each of which supplies data signals to the data lines, wherein each data line driving circuit includes:

a first D/A conversion unit that generates gray-scale signals from gray-scale data for designating gray-scale levels of the electro-optical elements;

a storage unit that stores correction data indicating correction values with respect to the gray-scale signals;

a second D/A conversion unit that has resolution different from that of the first D/A conversion unit, and that generates correction signals from the correction data stored in the storage unit; and a synthesizing unit that synthesizes the gray-scale signals generated by the first D/A conversion unit with the correction signals generated by the second D/A conversion unit to generate the data signals.

8. The data line driving circuit according to claim 7, wherein the resolution of the second D/A conversion unit of each of the signal processing circuits varies according to resolution adjustment signals to be supplied.

9. The data line driving circuit according to claim 8, wherein each electro-optical element corresponds to any one of a plurality of display colors, the second D/A conversion unit of one of the plurality of signal processing circuits corresponding to one display color has resolution varied according to a first resolution adjustment signal, and the second D/A conversion units of the other signal processing circuits corresponding to the other display colors have resolution varied according to a second resolution adjustment signal different from the first resolution adjustment signal.

10. The data line driving circuit according to claim 8, wherein the second D/A conversion unit includes a current source that generates a plurality of currents weighted with different weight values, on the basis of the level of the resolution adjustment signal, and a selection circuit that selects one of the plurality of currents according to the correction data, and generates the correction signals based on the current selected by the selection circuit.

11. The data line driving circuit according to claim 8, wherein the second D/A conversion unit includes a voltage generating circuit that generates a plurality of voltages, on the basis of the level of the resolution adjustment signal, and a selection circuit that selects one of the plurality of voltages according to the correction data, and generates the correction signals based on the voltage selected by the selection circuit.

12. The data line driving circuit according to claim 8, wherein the resolution adjustment signal is a clock signal, and the second D/A conversion unit includes a pulse signal generating circuit that generates a plurality of pulse signals having pulse widths which are weighted with different weight values, on the basis of a period of the resolution adjustment signal, and a selection circuit that selects one of the plurality of pulse signals according to the correction data, and generates the correction signals based on the pulse signal selected by the selection circuit.

13. An electro-optical device comprising:

a plurality of scanning lines;

a plurality of data lines;

a plurality of electro-optical elements that are respectively provided corresponding to intersections of the scanning lines and the data lines;

a scanning line driving circuit that sequentially selects the plurality of scanning lines; and a data line driving circuit that includes a plurality of signal processing circuits for respectively supplying data signals to the data lines, wherein each of the signal processing circuits includes:

a first D/A conversion unit that generates gray-scale signals from gray-scale data for designating gray-scale levels of the electro-optical elements;

a storage unit that stores correction data indicating correction values with respect to the gray-scale signals;

a second D/A conversion unit that has resolution different from that of the first D/A conversion unit, and that generates correction signals from the correction data stored in the storage unit; and a synthesizing unit that synthesizes the gray-scale signals generated by the first D/A conversion unit with the correction signals generated by the second D/A conversion unit to generate the data signals.

14. An electronic apparatus comprising the electro-optical device according to claim 13.

15. A method of driving an electro-optical device having a plurality of electro-optical elements whose gray-scale levels are varied according to data signals, comprising:

generating gray-scale signals from gray-scale data designating the gray-scale levels of the electro-optical elements by first D/A conversion;

generating correction signals from correction data stored in a storage unit by second D/A conversion that is different from the first D/A conversion in resolution; and synthesizing the gray-scale signals generated by the first D/A conversion with the correction signals generated by the second D/A conversion to generate the data signals.

* * * * *

UNITED STATES PATENT AND TRADEMARK OFFICE
CERTIFICATE OF CORRECTION

PATENT NO. : 7,443,540 B2
APPLICATION NO. : 11/179551
DATED : October 7, 2008
INVENTOR(S) : Schuster et al.

It is certified that error appears in the above-identified patent and that said Letters Patent is hereby corrected as shown below:

On the cover page,

Item [*] Notice: Subject to any disclaimer, the term of this patent is extended or adjusted under 35 USC 154(b) by 867 days Delete the phrase "by 867 days" and insert -- by 1270 days --

Signed and Sealed this

Twenty-fourth Day of August, 2010

David J. Kappos

David J. Kappos
*Director of the United States Patent and Trademark Office*